(12) United States Patent
Inoue et al.

(10) Patent No.: US 8,778,228 B2
(45) Date of Patent: Jul. 15, 2014

(54) METHOD OF PRODUCING ULTRAVIOLET LIGHT EMITTING PHOSPHOR MATERIAL

(75) Inventors: Osamu Inoue, Osaka (JP); Hiroshi Asano, Osaka (JP); Yusuke Fukui, Osaka (JP)

(73) Assignee: Panasonic Corporation, Osaka (JP)

(*) Notice: Subject to any disclaimer, the term of this patent is extended or adjusted under 35 U.S.C. 154(b) by 81 days.

(21) Appl. No.: 13/698,782

(22) PCT Filed: Jul. 17, 2012

(86) PCT No.: PCT/JP2012/004567
§ 371 (c)(1),
(2), (4) Date: Nov. 19, 2012

(87) PCT Pub. No.: WO2013/046511
PCT Pub. Date: Apr. 4, 2013

(65) Prior Publication Data
US 2013/0161561 A1 Jun. 27, 2013

(30) Foreign Application Priority Data
Sep. 27, 2011 (JP) ................................. 2011-211141

(51) Int. Cl.
*C09K 11/54* (2006.01)
*C09K 11/08* (2006.01)

(52) U.S. Cl.
USPC .............................. 252/301.6 R; 252/301.6 P

(58) Field of Classification Search
USPC ...................................... 252/301.6 R, 301.6 P
See application file for complete search history.

(56) References Cited

U.S. PATENT DOCUMENTS

| | | | | |
|---|---|---|---|---|
| 3,534,211 A | * | 10/1970 | Lehmann | 313/467 |
| 7,404,913 B2 | * | 7/2008 | Derenzo et al. | 252/301.6 R |
| 7,535,162 B2 | | 5/2009 | Ohashi et al. | |
| 2013/0119381 A1 | * | 5/2013 | Inoue et al. | 257/43 |

FOREIGN PATENT DOCUMENTS

| | | |
|---|---|---|
| JP | 2003-231878 | 8/2003 |
| JP | 2003-277748 | 10/2003 |
| JP | 2004-323818 | 11/2004 |
| JP | 2006-348244 | 12/2006 |
| WO | 2004/096949 | 11/2004 |
| WO | WO 2012/095920 | * 7/2012 |

* cited by examiner

*Primary Examiner* — Carol M Koslow
(74) *Attorney, Agent, or Firm* — Hamre, Schumann, Mueller & Larson, P.C.

(57) ABSTRACT

The present invention is a method of producing an ultraviolet light emitting phosphor material. This method includes a step of heat-treating a composition containing zinc and oxygen as main components and at least one selected from the group consisting of aluminum, gallium and indium as a sub-component, in the presence of at least two coexisting substances selected from the group consisting of zinc oxide, gallium oxide and phosphorus oxide under a non-oxidizing atmosphere.

6 Claims, 2 Drawing Sheets

METHOD OF PRODUCING ULTRAVIOLET LIGHT EMITTING PHOSPHOR MATERIAL

TECHNICAL FIELD

The present invention relates to a method of producing a phosphor material which contains zinc oxide as a main component and emits light efficiently in the ultraviolet region.

BACKGROUND ART

Conventionally, zinc oxide is known as a self-activated phosphor represented by ZnO:Zn and having a broad emission spectrum with a peak around 500 nm, and used as a green light emitting phosphor material excited by an electron beam for vacuum fluorescent displays. In this ZnO:Zn phosphor, the Zn-to-O ratio is greater than 1 and excess Zn is present. It is believed that the zinc interstitials or oxygen vacancies contribute to the green light emission of the phosphor.

On the other hand, zinc oxide is a compound semiconductor with a band gap of 3.4 eV, and is also strongly expected to be used, as a material capable of emitting light at shorter wavelengths in the ultraviolet region due to the interband transition, for phosphor exciting light sources, light emitting diodes (LEDs), etc. In fact, however, the above-mentioned zinc interstitials or oxygen vacancies are easily formed in zinc oxide, and conventional ZnO-based materials show only very weak emission in the ultraviolet region, although they exhibit intense emission in the green-blue region.

It has been reported that when zinc oxide is heat-treated in a hydrogen-containing gas atmosphere or hydrogen is introduced into zinc oxide by hydrogen plasma treatment or the like in order to solve this problem, ultraviolet emission is increased while green emission is suppressed (Patent Literatures 1 and 2).

The ultraviolet emission of zinc oxide is increased by the methods described in Patent Literatures 1 and 2, but it is still not enough.

CITATION LIST

Patent Literature

Patent Literature 1 JP 2003-277748 A
Patent Literature 2 JP 2006-348244 A

SUMMARY OF INVENTION

Technical Problem

It is an object of the present invention to provide a method of producing a zinc oxide-based ultraviolet light emitting material showing intense emission in the ultraviolet region.

Solution to Problem

The present invention has been made in view of the above problem, and an embodiment of the present invention is a method of producing an ultraviolet light emitting phosphor material. This method includes a step of heat-treating a composition containing zinc and oxygen as main components and at least one selected from the group consisting of aluminum, gallium and indium as a sub-component, in the presence of at least two coexisting substances selected from the group consisting of zinc oxide, gallium oxide and phosphorus oxide under a non-oxidizing atmosphere.

Advantageous Effects of Invention

The present invention can provide a zinc oxide-based light emitting material with significantly increased ultraviolet emission. Furthermore, the material produced by the present invention is also useful as a light emitting device or a transparent conductive material because it exhibits n-type conductivity and does not absorb visible light.

DESCRIPTION OF EMBODIMENTS

Figure 1:
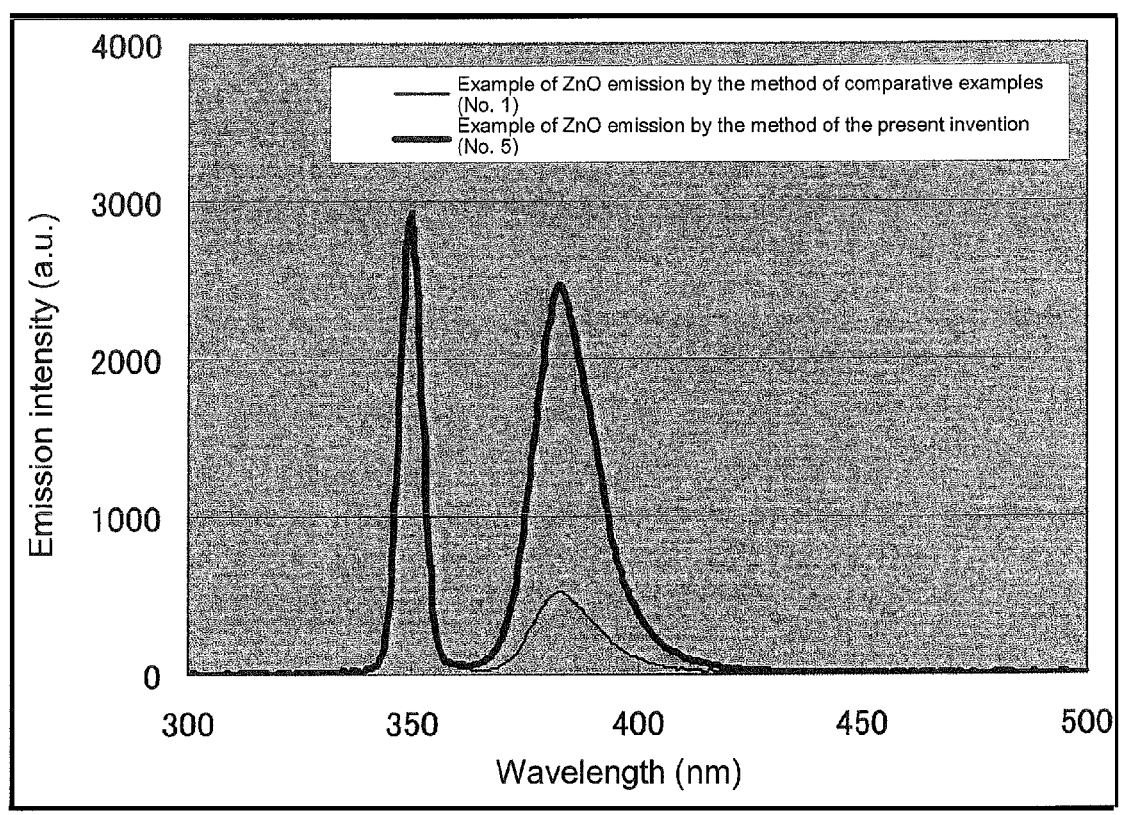
FIG. 1 is a diagram of emission spectra measured for a zinc oxide-based ultraviolet light emitting material produced according to an embodiment of the present invention and a zinc oxide-based ultraviolet light emitting material produced by a method of a comparative example.

Hereinafter, an embodiment and examples of the present invention will be described. The present invention is by no means limited to these embodiment and examples, and can be modified in various ways as appropriate without departing from the technical scope of the present invention.

An embodiment of the present invention is a method of producing an ultraviolet light emitting phosphor material. This method includes a step of heat-treating a composition containing zinc and oxygen as main components and at least one selected from the group consisting of aluminum, gallium and indium as a sub-component, in the presence of at least two coexisting substances selected from the group consisting of zinc oxide, gallium oxide and phosphorus oxide under a non-oxidizing atmosphere.

In a desirable mode of the embodiment, the coexisting substances in the heat treatment are zinc oxide, gallium oxide, and phosphorus oxide.

In a desirable mode of the embodiment, the coexisting substances in the heat treatment are gallium oxide and phosphorus oxide.

In a desirable mode of the embodiment, the composition further contains phosphorus as a sub-component.

In a desirable mode of the embodiment, the atmosphere for the heat treatment is a reducing atmosphere.

In a desirable mode of the embodiment, the temperature of the atmosphere for the heat treatment is not lower than 700° C. and not higher than 1000° C.

In the present invention, "ultraviolet emission" refers to the emission of light having an emission peak wavelength of 400 nm or less.

The present inventors produced compositions by adding various compound powders alone or in combination to a normal ZnO powder and heat-treating the resulting powders under various conditions, and evaluated the emission performance of these compositions. As a result, they found that when a composition obtained by adding a specific element to be described later to ZnO is heat-treated in the presence of specific coexisting substances to be described later, the resulting material has much more improved ultraviolet emission than that obtained by heat treatment of the composition alone (without the presence of the specific coexisting substances).

A sub-component required for the above composition is at least one selected from the group consisting of aluminum, gallium and indium. In the presence of this sub-component, green emission of zinc oxide is suppressed and ultraviolet emission thereof is improved. In addition, in the presence of this sub-component, zinc oxide decreases its electrical resistivity and exhibits n-type conductivity. Presumably, this is because divalent zinc sites of zinc oxide are substituted by trivalent aluminum, gallium or indium and thereby a donor level is formed in the band gap just below the conduction band. This means that aluminum, gallium or indium needs to substitute for zinc, and a mere mixture with zinc oxide is not effective in improving ultraviolet emission luminance.

Among these three substances, gallium most easily substitutes for zinc, while aluminum and indium less easily substitute for zinc. Therefore, gallium is most effective and most desirable in terms of performance. On the other hand, in terms of cost, aluminum is least expensive, while gallium and indium are rarer and more expensive than aluminum. Therefore, aluminum is most desirable in terms of cost. It is less advantageous to use indium than to use gallium or aluminum.

It is phosphorus, a second sub-component, that further increases the ultraviolet emission luminance when used in combination with the above sub-component. The emission luminance improving mechanism of phosphorus is not known. However, the facts that the addition of phosphorus alone has little effect in improving the luminance and that the addition of phosphorus tends to promote the substitution of aluminum, gallium or indium for Zn sites suggest that the substitution of phosphorus anions for oxygen sites of ZnO prevents the electroneutrality of ZnO from being broken by the substitution of aluminum, gallium or indium for Zn sites, and as a result, the substitution of aluminum, gallium or indium is promoted and the ultraviolet emission luminance is increased.

Since the object of the present invention is to improve the ultraviolet emission luminance of zinc oxide, the main components of the composition need to be zinc and oxygen. As used herein, the phrase "a composition contains zinc as a main component" refers to that the content of zinc is 80% or more, more desirably 90% or more, of the cationic elements, and the phrase "a composition contains oxygen as a main component" refers to that the content of oxygen is 80% or more, more desirably 90% or more, of the anionic elements. The total content of aluminum, gallium and indium as sub-components is desirably not less than 0.03 at. % and not more than 3.0 at. % of zinc. This is because less than 0.03 at. % does not have significant effect, and it is no use using more than 3.0 at. % because no further increase in the luminance is observed. However, even less than 0.03 at. % or more than 3.0 at. % is better than nothing for the increase in the luminance.

The content of phosphorus is desirably not less than 0.03 at. % and not more than 3.0 at. % of zinc, and the reason why this range is desirable is the same as that for the desirable total content of aluminum, gallium and indium.

The composition used in the present invention only have to contain zinc, oxygen, and one or more of the above sub-components, and it may further contain other components as long as its performance is not impaired. For example, magnesium oxide exhibits an effect of increasing the band gap of zinc oxide (i.e., shifting the emission wavelength of zinc oxide to the short wavelength side) when a small amount of magnesium oxide is solid-solved in zinc oxide. The use of one or more of the above sub-components with this zinc oxide-magnesium oxide solid solution system is also effective in suppressing green emission and improving ultraviolet emission intensity. Therefore, the composition used in the present invention may contain magnesium instead of a part of zinc component, and the zinc and magnesium components are regarded as main components of the cationic components of the resulting composition.

Next, the substances which should coexist with the composition used in the present invention during the heat treatment of the composition (hereinafter sometimes referred to as coexisting substances) are at least two selected from the group consisting of zinc oxide, gallium oxide and phosphorus oxide (i.e., a combination of zinc oxide and gallium oxide, a combination of zinc oxide and phosphorus oxide, a combination of gallium oxide and phosphorus oxide, and a combination of zinc oxide, gallium oxide and phosphorus oxide). Among them, the combination of gallium oxide and phosphorus oxide is desirable in terms of emission intensity. On the other hand, when considering that gallium oxide is expensive and phosphorus oxide is very hygroscopic, the combination of zinc oxide, gallium oxide and phosphorus oxide is desirable in terms of the balance among emission luminance, production cost, and ease of production. In this case, it is desirable to use a mixture of zinc oxide as a main component and a small amount of gallium oxide and phosphorus oxide. The mixing ratio of zinc oxide, gallium oxide and phosphorus oxide in the coexisting substance mixture is not particularly limited.

The ultraviolet emission luminance of the composition is increased by heat treatment in the presence of these coexisting substances. It is not known exactly why, but this increase may be attributed to the following effects:

(1) the effect of suppressing the sublimation and evaporation of ZnO from the composition;

(2) the effect of suppressing the detachment of oxygen from ZnO in the composition;

(3) the effect of suppressing the sublimation and evaporation of $P_2O_5$ from the composition; and (4) the effect of reducing the influence of residual oxygen in the system on the composition.

Next, a method of heat-treating a composition together with coexisting substances may be carried out in such a manner that: a raw material mixture for obtaining the above composition by heat treatment is heat-treated together with the coexisting substances so that the raw material mixture is converted into the composition during the heat treatment and then the resultant composition is heat-treated together with the coexisting substances; or that the above composition is previously produced from the raw material mixture and heat-treated together with the coexisting substances. The raw material is, for example, an oxide containing a cationic element, a compound to be converted into this oxide by heat treatment, or the like. The raw material mixture may be used in the form of a powder, or may be used in the form of a powder compact obtained by powder compacting or the like, in view of ease of handling. The shape of the composition to be heat-treated may be determined as appropriate depending on the intended use of the resulting ultraviolet light emitting phosphor material. For example, it may be a thick film, a thin film, or the like.

Next, these coexisting substances are effective in any form such as powders or sintered bodies. As can be inferred from the above effects (1) to (4), a larger surface area is desirable. Therefore, it is favorable to use them in the form of powders or powder compacts.

Figure 2A:
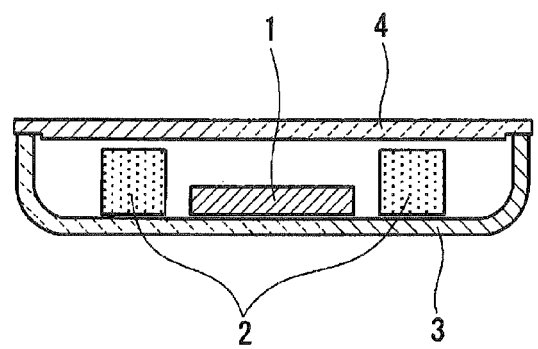
FIG. 2 is a sectional view showing examples of placement of a composition and coexisting substances for heat treatment in the present invention.
Figure 2B:
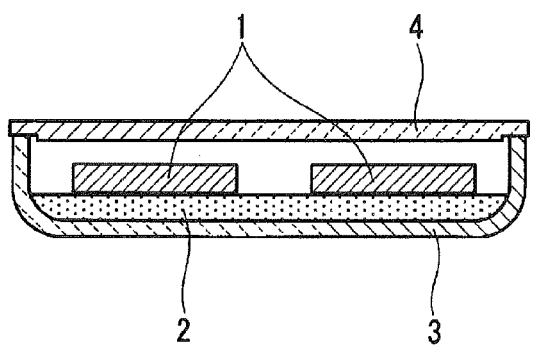
Figure 2C:
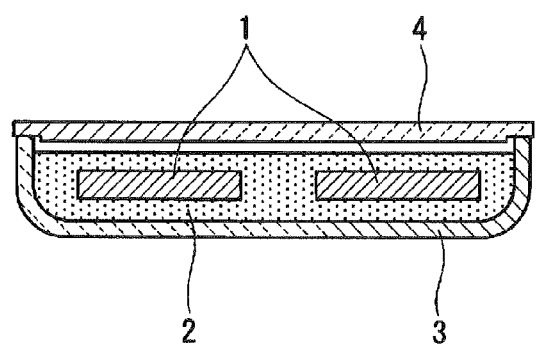

The phrase "heat treatment in the presence of coexisting substances" refers to the heat treatment of the composition near the coexisting substances. The composition and the coexisting substances do not necessarily have to be in direct contact with each other, and a small space may be provided between the composition and the coexisting substances by a spacer or the like. As can be inferred from the above effects (1) to (4), it is more desirable to place the composition and the coexisting substances adjacent to each other than to space them from each other (FIG. 2(a)). If the coexisting substances are powders, it is desirable to spread the powders beneath the composition (FIG. 2(b)) or to embed the composition in the powders (FIG. 2(c)) (in FIG. 2, reference numerals 1, 2, 3 and 4 denote the composition, the coexisting substances, a sheath for heat treatment, and a lid of the sheath for heat treatment, respectively).

The present invention may be carried out in such a manner that compounds, each of which is converted into zinc oxide, gallium oxide or phosphorus oxide by heat treatment, are used to allow the composition and the coexisting substances to coexist during the heat treatment.

When heat treatment is performed in an open environment, sublimation or evaporation more easily occurs. Therefore, it is most effective to perform heat treatment, for example, in a closed glass tube in which the composition and these coexisting substances are enclosed. However, this method is less productive.

From a practical viewpoint, it is most desirable to perform heat treatment in a semi-closed environment where, for example, the composition and these coexisting substances are placed in a refractory container such as a firing sheath, a crucible or the like as shown in FIG. 2 and the container is closed with a lid. As described above, the present invention needs no special apparatus in the production of ultraviolet light emitting materials and thus is advantageous in terms of cost and mass productivity.

Next, heat treatment under a non-oxidizing atmosphere refers not to heat treatment in the air, which contains oxygen richly and thus is oxidizing, but to heat treatment under a neutral atmosphere such as nitrogen gas, argon gas or helium gas, or under a reducing atmosphere. Heat treatment may usually be performed in inexpensive nitrogen gas. The residual oxygen concentration in the non-oxidizing atmosphere (in particular, nitrogen gas) is desirably 100 ppm or less, more desirably 10 ppm or less, and further desirably 1 ppm or less. In the present invention, heat treatment can be performed under a neutral atmosphere. Therefore, the emission luminance can also be increased without using flammable hydrogen gas.

Furthermore, in order to reduce the oxygen partial pressure in the non-oxidizing atmosphere, it is desirable to change a neutral atmosphere such as nitrogen gas to a reducing atmosphere by mixing hydrogen gas into the neutral atmosphere. When the composition is heat-treated under a reducing atmosphere, its emission luminance can further be improved.

Hydrogen gas is mixed to further reduce the concentration of a trace amount of oxygen remaining in a neutral atmospheric gas such as nitrogen gas. Here, since the degree of reduction in the oxygen concentration by mixing with hydrogen gas depends only on the temperature unless the concentration of hydrogen gas is extremely low, the concentration of hydrogen gas is not limited. However, the concentration of hydrogen gas is desirably less than 4% because hydrogen gas may explode if it escapes into the air and its concentration exceeds 4%. On the other hand, the lower concentration limit of hydrogen may be about 0.1% because the amount of oxygen remaining in a neutral atmospheric gas such as nitrogen gas is usually very small. In practice, however, oxygen may be adsorbed onto a material of inside of an atmospheric furnace used for heat treatment or oxygen may enter the furnace from outside through a small leak in the furnace. In view of these cases, the concentration of hydrogen is desirably as high as possible within the explosion limit. Therefore, the desirable oxygen concentration is as high as possible within the range of less than 4%. Practically, it is 0.5% or more but less than 4%.

As another method of reducing the oxygen partial pressure, an oxygen getter metal or a lower metal oxide may be used.

Next, in the present invention, the desirable temperature of the heat treatment of the composition and the coexisting substances is not lower than 700° C. and not higher than 1000° C. This is because no significant effect cannot be obtained if the temperature is either higher or lower than this range. It is also desirable to select a temperature at which the coexisting substances are not sintered into the composition.

The time of the heat treatment of the composition and the coexisting substances may be determined as appropriate depending on the scale and productivity of the heat treatment. The time is, for example, 10 minutes to 20 hours.

Hereinafter, an embodiment of the present invention will be described in more detail by way of examples. In the examples below, the following heat treatment methods are described: a method using a powder compact of a raw material mixture for heat treatment; and a method using a sintered body (composition) of the raw material mixture for heat treatment, and the heat treatment temperature is limited to 800° C., but the present invention is not limited to these examples.

Example 1

As starting materials, a ZnO powder with a purity of 5N, $Ga_2O_3$ with a purity of 4N, and diammonium hydrogen phosphate $(NH_4)_2HPO_4$ (special grade reagent) were prepared. Here, diammonium hydrogen phosphate is heated to be decomposed into $P_2O_5$ at low temperature.

These materials were weighed at Zn/Ga/P atomic ratios of 100:1:1 and 100:1:0, and wet-mixed in a ball mill and dried to obtain powder mixtures. 1 g of each of these powder mixtures was put into a mold, and uniaxially pressed at a pressure of 5 MPa using the mold. Thus, disc-shaped powder compacts with a diameter of 12 mm and a thickness of 1 mm were obtained. For comparison, a similar powder compact consisting only of a ZnO powder and containing neither Ga nor P was produced (No. 11 in Table 1).

Next, various powder mixtures of the same raw material powders were produced in the same manner at the mixing ratios of coexisting substances shown in Table 1. 5 g of each of these powders was spread over the bottom of an alumina crucible, and the produced powder compact was put thereon and the crucible was closed with a lid (FIG. 2 (b)). The diameter of the alumina crucible was 30 mm. The thickness of the spread powder layer was 1 mm, and the height from the powder layer to the lid was 5 mm. The crucible was placed in an electric furnace, and the electric furnace was filled with nitrogen gas to create a non-oxidizing atmosphere. As described above, the crucible was closed with the lid and was in a semi-closed environment. Therefore, the crucible was filled with nitrogen gas. Then, the crucible was subjected to heat treatment at 800° C. for 2 hours. After the heat treatment, no firing shrinkage, i.e., densification of the powder compact was observed.

After the heat treatment, the PL emission of each powder compact was measured at an excitation wavelength of 350 nm.

FIG. 1 shows, as examples of emission spectra, the emission spectrum of the powder compact after the heat treatment of No. 1 in Table 1, which was obtained by placing only the powder compact in the crucible, and that of No. 5, which was obtained by using the coexisting substances in the present invention. In FIG. 1, the peak around 350 nm is the excitation light itself, and the emission with a peak around 380 nm is the ultraviolet emission intended by the present invention. This shows that the material produced by the method of the present invention exhibits more intense ultraviolet emission.

The emissions of samples other than No. 1 and No. 5 in Table 1 also were measured in the same manner. In the measured spectrum of each of these samples, only the excitation light around 350 nm and the ZnO emission with a peak around 380 nm were observed, as in the case of No. 1 and No. 5.

The ratios of the peak intensities of these samples to the peak intensity of No. 1 around 380 nm was calculated, taking the latter as 1.0. Table 1 shows the results. In this table, the intensity ratio denoted as <0.1 indicates that a trace level of ultraviolet emission was observed around 380 nm, that is, virtually no ultraviolet emission was observed.

TABLE 1

| No. | Mixing ratio of composition components (at. %) | | | Mixing ratio of coexisting substances (at. %) | | | Ultraviolet emission intensity | Example/ Comparative Example |
|---|---|---|---|---|---|---|---|---|
| | Zn | Ga | P | Zn | Ga | P | | |
| 1 | 100 | 1 | 1 | | | | 1.0 | Com. Example |
| 2 | 100 | 1 | 1 | 100 | | | 1.1 | Com. Example |
| 3 | 100 | 1 | 1 | 100 | 1 | | 3.1 | Example |
| 4 | 100 | 1 | 1 | 100 | | 1 | 3.8 | Example |
| 5 | 100 | 1 | 1 | 100 | 1 | 1 | 4.7 | Example |
| 6 | 100 | 1 | | | | | <0.1 | Com. Example |
| 7 | 100 | 1 | | 100 | | | <0.1 | Com. Example |
| 8 | 100 | 1 | | 100 | 1 | | 0.6 | Example |
| 9 | 100 | 1 | | 100 | | 1 | 1.3 | Example |
| 10 | 100 | 1 | | 100 | 1 | 1 | 1.9 | Example |
| 11 | 100 | | | 100 | 1 | 1 | <0.1 | Com. Example |

As is apparent from Table 1, in No. 1 to No. 5 samples with a composition ratio of 100:1:1, No. 3 and No. 4 each obtained in the presence of ZnO and $Ga_2O_3$ or ZnO and $P_2O_5$ exhibited more intense ultraviolet emission than No. 1 obtained without using any coexisting substance and No. 2 obtained in the presence of only ZnO. The most intense ultraviolet emission was observed in No. 5 obtained in the presence of all of the three coexisting substances.

Next, a similar tendency was also seen in No. 6 to No. 10 samples with a composition ratio of 100:1:0, i.e., containing no phosphorus. However, the intensities of these compositions were in general lower than those of No. 1 to No. 5, which shows that the compositions desirably contain P.

On the other hand, as shown in the No. 11, a composition consisting only of ZnO exhibited very little ultraviolet emission even with the combined use of ZnO, $Ga_2O_3$ and $P_2O_5$, which is the most effective combination of coexisting substances.

Example 2

As starting materials, a ZnO powder with a purity of 5N, $Ga_2O_3$, $Al_2O_3$ and $In_2O_3$ with a purity of 4N, and diammonium hydrogen phosphate $(NH_4)_2HPO_4$ (special grade reagent) were prepared as in Example 1.

These materials were weighed at Zn/Ga/Al/In/P atomic ratios as shown in the mixing ratios of the composition components in Table 2, and wet-mixed in a ball mill and dried to obtain powder mixtures. 1 g of each of these powder mixtures was put into a mold, and uniaxially pressed at a pressure of 5 MPa using the mold to obtain powder compacts of the same shape as those of Example 1. The powder compacts were each placed in an electric furnace and fired at 1000° C. in nitrogen. Thus, sintered bodies (compositions) were obtained. The ultraviolet emission intensities of these sintered bodies were measured, but no such emission was observed. The densities of the powder compacts and the sintered bodies were each calculated from the size and weight of these samples. The densities of the powder compacts were about 2.6 kg/cm$^3$ and those of the sintered bodies were about 5.0 g/cm$^3$, which means that the firing shrinkage, i.e., densification was observed.

Next, various powder mixtures of the same raw material powders were produced in the same manner at the mixing ratios of coexisting substances shown in Table 2. 5 g of each of these powders was spread over the bottom of an alumina crucible, the produced sintered body was put thereon, and 3 g of the powder was further added to embed the sintered body therein. The crucible was closed with a lid, and subjected to heat treatment at 800° C. for 2 hours in nitrogen or in a mixed gas of nitrogen and 2% hydrogen in an electric furnace. The same alumina crucible and electric furnace as those of Example 1 were used.

The PL emissions of the sintered bodies thus obtained were each measured in the same manner as in Example 1. From the measurement results, the ratios of the ultraviolet emission intensities of these samples to the intensity of the No. 24 sample around 380 nm were calculated, taking the latter as 1.0. The No. 24 sample was obtained by heat-treating the composition, in which Ga was added to ZnO, in the presence of ZnO and $Ga_2O_3$ under a nitrogen atmosphere according to the present invention. Table 2 shows the results. The intensity ratio denoted as <0.1 indicates that there was very little change in the ultraviolet intensity of the sintered body before and after the heat treatment and virtually no ultraviolet emission was observed.

TABLE 2

| No. | Mixing ratio of composition components | | | | | Mixing ratio of coexisting substances | | | | | Heat treatment atmosphere | Ultraviolet emission intensity | Example/ Comparative Example |
|---|---|---|---|---|---|---|---|---|---|---|---|---|---|
| | Zn | Ga | Al | In | P | Zn | Ga | Al | In | P | | | |
| 21 | 100 | | | | | | | | | | N2 | <0.1 | Com. |
| 22 | 100 | 0.1 | | | | | | | | | N2 | <0.1 | Com. |
| 23 | 100 | 0.1 | | | | 100 | | | | | N2 | <0.1 | Com. |
| 24 | 100 | 0.1 | | | | 100 | 1 | | | | N2 | 1.0 | Ex. |
| 25 | 100 | 0.1 | | | | 100 | | 1 | | | N2 | <0.1 | Com. |
| 26 | 100 | 0.1 | | | | 100 | | | 1 | | N2 | <0.1 | Com. |
| 27 | 100 | 0.1 | | | | 100 | | | | 1 | N2 | 0.4 | Ex. |
| 28 | 100 | 0.1 | | | | 100 | 1 | | | 1 | N2 | 1.2 | Ex. |
| 29 | 100 | | 0.1 | | | 100 | 1 | | | | N2 | 0.5 | Ex. |
| 30 | 100 | | | 0.1 | | 100 | 1 | | | | N2 | 0.6 | Ex. |
| 31 | 100 | | | | 0.1 | 100 | 1 | | | | N2 | <0.1 | Com. |

TABLE 2-continued

| No. | Mixing ratio of composition components | | | | | Mixing ratio of coexisting substances | | | | | Heat treatment atmosphere | Ultraviolet emission intensity | Example/ Comparative Example |
|---|---|---|---|---|---|---|---|---|---|---|---|---|---|
| | Zn | Ga | Al | In | P | Zn | Ga | Al | In | P | | | |
| 32 | 100 | 0.1 | | | 0.1 | 100 | 1 | | | | N2 | 1.4 | Ex. |
| 33 | 100 | 0.1 | | | 0.1 | 100 | 1 | | | 1 | N2 | 1.7 | Ex. |
| 34 | 100 | | | | | 100 | 1 | | | 1 | N2 | <0.1 | Com. |
| 35 | 100 | | | | | | | | | | N2—H2 | <0.1 | Com. |
| 36 | 100 | 0.1 | | | | | | | | | N2—H2 | 0.2 | Com. |
| 37 | 100 | 0.1 | | | | 100 | | | | | N2—H2 | 0.2 | Com. |
| 38 | 100 | 0.1 | | | | 100 | 1 | | | | N2—H2 | 6.6 | Ex. |
| 39 | 100 | 0.1 | | | | 100 | | 1 | | | N2—H2 | 0.1 | Com. |
| 40 | 100 | 0.1 | | | | 100 | | | 1 | | N2—H2 | 0.1 | Com. |
| 41 | 100 | 0.1 | | | | 100 | | | | 1 | N2—H2 | 2.8 | Ex. |
| 42 | 100 | 0.1 | | | | 100 | 1 | | | 1 | N2—H2 | 7.2 | Ex. |
| 43 | 100 | | 0.1 | | | 100 | 1 | | | | N2—H2 | 3.0 | Ex. |
| 44 | 100 | | | 0.1 | | 100 | 1 | | | | N2—H2 | 3.5 | Ex. |
| 45 | 100 | | | | 0.1 | 100 | 1 | | | | N2—H2 | <0.1 | Com. |
| 46 | 100 | 0.1 | | | 0.1 | 100 | 1 | | | | N2—H2 | 6.9 | Ex. |
| 47 | 100 | 0.1 | | | 0.1 | 100 | 1 | | | 1 | N2—H2 | 8.0 | Ex. |
| 48 | 100 | | | | | 100 | 1 | | | 1 | N2—H2 | <0.1 | Com. |
| 49 | 100 | | | | | | 100 | | | 10 | N2 | 0.1 | Com. |
| 50 | 100 | 0.1 | | | | | 100 | | | 10 | N2 | 7.0 | Ex. |
| 51 | 100 | | 0.1 | | | | 100 | | | 10 | N2 | 2.5 | Ex. |
| 52 | 100 | | | 0.1 | | | 100 | | | 10 | N2 | 3.1 | Ex. |
| 53 | 100 | | | | 0.1 | | 100 | | | 10 | N2 | 0.2 | Com. |
| 54 | 100 | 0.1 | | | 0.1 | | 100 | | | 10 | N2 | 7.3 | Ex. |
| 55 | 100 | 0.1 | | | | | 100 | | | 10 | N2—H2 | 7.9 | Ex. |
| 56 | 100 | 0.1 | | | | 50 | 50 | | | 10 | N2 | 6.4 | Ex. |

Before the heat treatment, all the samples should exhibit no ultraviolet emission and be denoted as <0.1 in Table 2. However, as is apparent from Table 2, in the case of heat treatment in nitrogen, ultraviolet emission was observed only when compositions containing ZnO and Al, Ga or In added thereto were heat-treated in the presence of at least two coexisting substances selected from the group consisting of ZnO, $Ga_2O_3$ and $P_2O_5$ according to the examples of the present invention, and the other compositions of comparative examples exhibited no such emission even after the heat treatment (No. 21 to No. 34).

The addition of $Ga_2O_3$, $Al_2O_3$ or $In_2O_3$ to ZnO in compositions was always effective (No. 28 to No. 30). As for the coexisting substances, the combination of ZnO and $Ga_2O_3$ or ZnO and $P_2O_5$ was effective (No. 24 and No. 27), and no effect was observed in the combination of ZnO and $Al_2O_3$ or ZnO and $In_2O_3$ (No. 25 and No. 26).

No. 24 was compared with No. 29 and No. 30 to compare the elements added to ZnO in the compositions. As a result, the composition in which Ga was added had a higher luminance than the compositions in which Al or In was added. No. 24 was further compared with No. 28, No. 32 and No. 33. As a result, the P-containing compositions or the compositions obtained in the presence of P as a coexisting substance had high luminances, but no emission was observed in the composition containing P but containing none of Al, Ga and In (No. 31). Likewise, the most effective combination of coexisting substances is that of three coexisting substances, ZnO, $Ga_2O_3$ and $P_2O_5$ (No. 28 and No. 33), but the composition consisting of ZnO with no additive exhibited no emission even in the presence of these three coexisting substances (No. 34).

Next, when heat treatment was performed in a mixed gas of nitrogen and 2% hydrogen (under a reducing atmosphere), the luminances were increased in general (No. 35 to No. 48).

In No. 36, No. 37, No. 39 and No. 40 of the comparative examples, the same compositions as used in No. 22, No. 23, No. 25 and No. 26, respectively, exhibiting no emission by heat treatment under a nitrogen atmosphere were heat-treated in the presence of the same coexisting substances as used therein in a mixed gas of nitrogen and 2% hydrogen. In these samples, faint emission was observed unlike No. 22, No. 23, No. 25 and No. 26. However, their luminances were low, and a tendency observed in the case of the nitrogen-2% hydrogen mixed gas was similar to that observed in the case of nitrogen gas.

On the other hand, in the examples of the present invention, it was found that the heat treatment in the mixed gas of nitrogen and 2% hydrogen (under a reducing atmosphere) allowed the luminances to be increased significantly compared to the heat treatment under a nitrogen atmosphere.

Next, when only gallium oxide and phosphorus oxide were used as coexisting substances without using ZnO, very little emission was observed in a composition consisting only of ZnO and containing no additive or a composition containing ZnO and only P added thereto (No. 49 and No. 53). Compositions in which $GaO_2O_3$, $Al_2O_3$, or $In_2O_3$ was added exhibited relatively high luminances even under a nitrogen atmosphere (No. 50 to No. 52 and No. 54). In this case, the effect of further increasing the luminance was modest at best even under the nitrogen-2% hydrogen mixed gas atmosphere (No. 55).

The method using only gallium oxide and phosphorus oxide is advantageous in increasing the luminance without using hydrogen, but gallium oxide is very expensive. Therefore, the amount of gallium oxide used was reduced to some extent and zinc oxide was used instead. However, no significant decrease in the luminance was observed (No. 56).

In addition to the above examples, the present inventors performed the same studies by varying the ratio of composition components and heat treatment conditions, and the same results were obtained in all the cases.

INDUSTRIAL APPLICABILITY

An ultraviolet light emitting material obtained by the present invention can be used in a wide variety of applications such as phosphor exciting materials and LED devices.

The invention claimed is:

1. A method of producing an ultraviolet light emitting phosphor material, comprising a step of heat-treating a composition containing zinc and oxygen as main components and at least one selected from the group consisting of aluminum, gallium and indium as a sub-component, in the presence of at least two coexisting substances selected from the group consisting of zinc oxide, gallium oxide and phosphorus oxide under a non-oxidizing atmosphere.

2. The method of producing an ultraviolet light emitting phosphor material according to claim 1, wherein the coexisting substances in the heat treatment are zinc oxide, gallium oxide, and phosphorus oxide.

3. The method of producing an ultraviolet light emitting phosphor material according to claim 1, wherein the coexisting substances in the heat treatment are gallium oxide and phosphorus oxide.

4. The method of producing an ultraviolet light emitting phosphor material according to claim 1, wherein the composition further contains phosphorus as a sub-component.

5. The method of producing an ultraviolet light emitting phosphor material according to claim 1, wherein the atmosphere for the heat treatment is a reducing atmosphere.

6. The method of producing an ultraviolet light emitting phosphor material according to claim 1, wherein the temperature of the atmosphere for the heat treatment is not lower than 700° C. and not higher than 1000° C.

* * * * *